June 28, 1932.  W. F. EGER  1,865,359
FISH BAIT
Filed Dec. 16, 1931

William F. Eger
INVENTOR

BY Victor J. Evans & Co.
ATTORNEY

Patented June 28, 1932

1,865,359

UNITED STATES PATENT OFFICE

WILLIAM F. EGER, OF BARTOW, FLORIDA

FISH BAIT

Application filed December 16, 1931. Serial No. 581,487.

My present invention has reference to an artificial fish bait, and my primary object is the provision of an artificial casting bait, which, when drawn through the water will travel below the surface of the water with a wiggling movement closely resembling that of a crawfish, grasshopper, or other live insects, and which, except for the hook and spinner are of soft pliable material, so that a fish striking the same without grasping the hook will experience the same feeling as if the fish had contacted a live insect and which deception will cause the fish on the next strike to swallow the bait, and thus be readily caught by the fisherman.

A further object is the provision of an artificial bait in which the hook is so balanced that the point of the said hook is held upward while the bait is drawn through the water and also wherein the bait is rendered practically weedless without the use of the usual barbs, stiff wires, etc., which hinder fish from shutting down on the bait after they grab it and which causes the loss of the fish, the tail of the bait being of colored rubber strips or fringes that constitute the main attraction for the bait and also partly and wholly conceals the hook, the rubber being of such quality that it will not be affected by the water and will withstand unusual wear and tear and which also is in the nature of a fender so that the bait will be practically free from entanglement with weeds.

A further object of the invention is the provision of an artificial bait with a spoon-like spinner which is colored and which is mounted on the leader wire in a manner to insure the free rotation thereof when the bait is drawn through the water.

To the attainment of the foregoing the invention consists in the improvement hereinafter described and definitely claimed.

Figure 1:
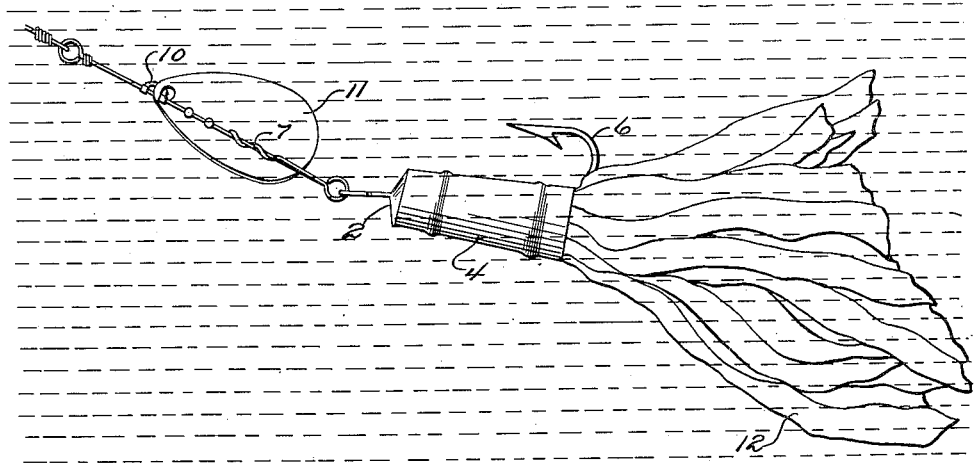
Figure 1 is a side elevation of the improvement.
Figure 2:
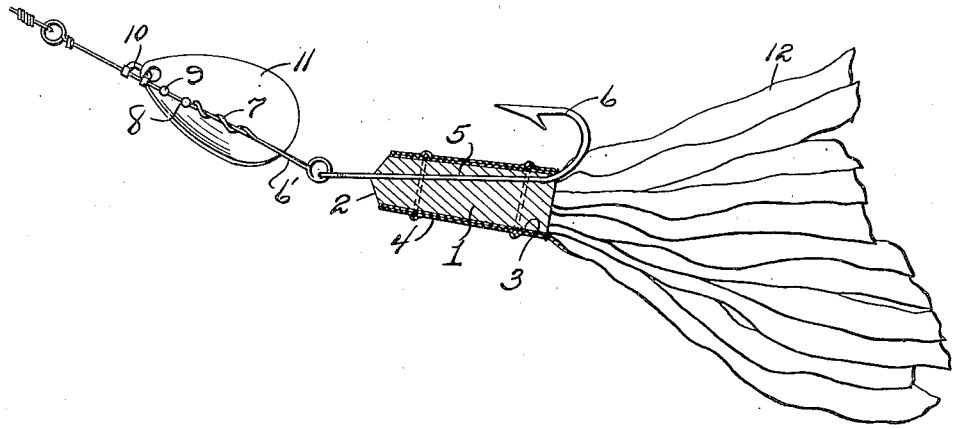
Figure 2 is a similar view with parts in section.

The body 1 of the bait is of lead or other heavy material and is of frusto-conical formation and has its outer reduced end or nose 2 tapered to its center. The body 1 has arranged around its outer face a rubber sleeve 2 secured thereon at spaced intervals by thin wire bails 3, and these outwardly projecting bails are received in the inner faces of an outer rubber sleeve 4.

There is passed through the center of the nose 2 and the body 1 and through the rear and widened end of the said body, adjacent one edge thereof the shank 5 of a hook 6. To the outer and eye end of the shank there is secured the eye end of a wire leader 6' to whose outer wire end the fishing lines are attached. The wire leader 6' is bent and continued upon itself from the inner end and twisted around the main strand of wire, as indicated by the numeral 7 and there is fixed upon the leader, outward of the said twisted portion 7 a ball or sphere 8 that is designed to be contacted by a similar ball or sphere 9 that is slidable on the leader, and the slidable sphere 9 affords a bearing for a yoke 10 whose arms are provided with eyes that are slidable upon the leader 6. The yoke 10 passes through an opening in the reduced end of a spoon-bowl shaped spinner 11. The spinner is suitably colored to draw the attention of fish and incident to its construction and the manner in which the same is mounted upon the leader 6' and rotation of the colored spinner creates a ripple in the water which almost perfectly simulates a butterfly or other insect. The spinner thus draws the attention of the fish to the bait.

The rubber sleeves 2 and 4 are secured together and to the body 1 by marine glue and while these sleeves are of thin and soft material they are compressible to a degree that should a fish, in a strike at the bait, contact therewith the said compressible sleeves will deceive the sense of touch of the fish to an extent that he will make another strike and swallow the bait. Either or both of the sleeves are formed at one end of rubber sheets and these sheets are slitted longitudinally to provide inner and outer differently colored ribbons or streamers 12, respectively. The streamers provide a screen for the hook, and an unsuccessful strike against these streamers will contact with only a soft pliable surface which will not retard the fish in the second strike in swallowing the bait. The streamers or ribbons will spread away from each other when the bait is drawn through the water and thereby render the bait practically free from entanglement with weeds.

Having described the invention, I claim:

1. An artificial casting bait comprising a weighted body which is of frusto conical formation and which has its reduced end tapered to the center thereof, a hook having its shank passing centrally through the nose and angularly through the body, soft rubber sleeves on the body and said sleeves being formed on the ends of rubber sheets which are differently colored and which extend from the widened end of the body and are slitted longitudinally to provide a screen for the hook and also to provide streamers.

2. An artificial casting bait comprising a weighted body which is of frusto conical formation and which has its reduced end tapered to the center thereof, a hook having its shank passing centrally through the nose and angularly through the body, soft rubber sleeves surrounding the body and secured thereto and to each other by marine glue, bails surrounding the inner sleeve for outwardly bulging the outer sleeve, said sleeves being formed on the ends of rubber sheets which are differently colored, and which are slitted longitudinally to provide a screen for the hook and a fish lure.

In testimony whereof I affix my signature.

WILLIAM F. EGER.